(12) United States Patent
Koch et al.

(10) Patent No.: US 6,613,159 B1
(45) Date of Patent: Sep. 2, 2003

(54) FLUX FOR BRAZING DIFFICULT TO WET METALLIC MATERIALS

(75) Inventors: Jürgen Koch, Mühlheim (DE); Sandra Wittpahl, Hanau (DE); Wolfgang Weber, Karlstein (DE); Wolfgang Kohlweiler, Frankfurt (DE)

(73) Assignee: Degussa-Huls Aktingesellschaft, Frankfurt am Main (DE)

( * ) Notice: Subject to any disclaimer, the term of this patent is extended or adjusted under 35 U.S.C. 154(b) by 0 days.

(21) Appl. No.: 09/565,482

(22) Filed: May 5, 2000

(30) Foreign Application Priority Data

May 8, 1999 (DE) .......................... 199 21 332

(51) Int. Cl.$^7$ ..................... B23K 35/362; B23K 35/363
(52) U.S. Cl. .............................. 148/26; 148/23; 148/24
(58) Field of Search .............................. 148/26, 23, 24; 228/101

(56) References Cited

U.S. PATENT DOCUMENTS 3,511,701 A * 5/1970 Mouton ....................... 148/26

FOREIGN PATENT DOCUMENTS

| DE | 24 44 521 | * | 3/1975 | |
|----|-----------|---|--------|---|
| GB | 909314 | * | 10/1962 | |
| SU | 1488169 A | * | 6/1989 | ........... B23K/35/36 |

OTHER PUBLICATIONS

English translation of SU 1488169.*

* cited by examiner

*Primary Examiner*—Roy King
*Assistant Examiner*—Harry D. Wilkins, III
(74) *Attorney, Agent, or Firm*—Kalow & Springut LLP

(57) ABSTRACT

A flux based on inorganic boron and/or halogen compounds for brazing difficult to wet metallic materials with silver- and copper-based solders, which contains, as an activating addition, based on the total amount of the flux, 0.01–10 wt. % of elemental boron and 0.01–10 wt. % of at least one of the elements Mo, W, Mn, Co, Ni, Pd, Cu or Ag in the form of elements, alloys or compounds. The activating addition brings about a substantial increase in the wettability by the solder, particularly in the case of difficult to wet stock materials.

18 Claims, No Drawings

FLUX FOR BRAZING DIFFICULT TO WET METALLIC MATERIALS

INTRODUCTION AND BACKGROUND

The present invention relates to a flux for brazing difficult to wet metallic stock materials with silver- and copper-based solders. Metallic stock materials of this kind which are difficult to wet by the solder in the brazing process are substantially stainless and scale-free steels and composite materials produced by powder metallurgy, such as carbide metals.

Soldering is a thermal process for joining and coating metallic stock materials or metallic workpieces by fusion, wherein a liquid phase is obtained by melting a metallic material, namely the solder. The solidus temperature of the stock materials is not reached during this process. As used herein the terms "workpiece" and "stock material" are interchangeable.

Solders used are alloys or pure metals. If solders are processed whose liquidus temperature is above 450° C., the term brazing is used.

Assuming pure metal surfaces, the liquid solder is able to wet the metallic stock material in so far as it forms mixed crystals or intermetallic compounds with said stock material. The solder then spreads out over the joint surface and, after solidifying, forms a loadable joint with the metallic stock material.

If designed in a manner suitable for soldering, the two joint surfaces of the parts to be joined form a narrow parallel slit. The molten solder then flows of its own accord into the soldering slit due to the capillary filling pressure taking effect, and fills said slit. The minimum temperature on the surface of the component to be soldered at which said process takes place undisturbed is the so-called working temperature. It is a characteristic quantity for the solder in question.

In order to be able to form a bond with the metallic stock material, the molten solder must come into direct contact with the metallic stock material. Oxide layers of the kind present on any engineering metal surface must thus be loosened first and removed. If soldering takes place in the air, this is achieved by covering the soldering site with fluxes in the melt flow of which the oxides dissolve or are decomposed at soldering temperature.

The flux thus primarily has the task of removing oxides present on the solder and stock material surfaces and preventing them from re-forming during the soldering process so that the solder is able to wet the stock material sufficiently.

The melting point and the effective temperature of the fluxes must be matched to the working temperature of the solder used, whereby the flux should melt at about 50–100° below the working temperature of the solder used and become fully effective from this temperature onwards. Moreover, the molten flux should form a dense, uniform coating on the workpiece which remains intact at the required soldering temperature and for the duration of the soldering period.

Brazing fluxes are composed substantially of salt mixtures which, in the molten state, are capable of dissolving metal oxides. Said fluxes are substantially inorganic boron compounds such as, in particular, alkali borates and fluoroborates, and halides such as, in particular, an alkali halide; e.g. alkali fluorides.

The standard DIN EN 1045 classifies fluxes for brazing heavy metals (FH type) into seven classes according to their composition and effective temperature. The fluxes are used as powders, pastes or suspensions, the latter being applied to the workpieces by spraying, brushing or dipping. They are then heated to melting point and the workpiece materials are joined together by fusion by adding solder. It is also known to combine flux and solder in one product. Flux-coated moulded parts or flux-covered solder wires are thus also used in practice for joining the workpieces or stock materials.

DE 24 44 521 describes a flux for soldering which is composed of boric acid and various alkali metal polyborates. Said flux may also additionally contain 1 wt. % of boron in elemental form.

GB 909 314 discloses a brazing flux for brazing nickel and nickel alloys. Said flux contains, apart from the conventional constituents such as potassium tetrafluoroborate, potassium metaborate and potassium fluoride, additionally copper compounds such as copper oxide and copper chloride. The latter constituents are claimed to suppress the reaction of the flux with the stock material in order to prevent the latter becoming brittle.

The well known fluxes have a major disadvantage, however. Difficult to wet stock materials such as, for example, stainless and scale-free steels and carbide metals, particularly carbide metals with low cobalt contents of less than 6% (K01–K10, PO5) are wetted only insufficiently by the liquid solder when the conventional fluxes are used. Fluxes containing an addition of elemental boron (FH12 type) are used in engineering to join said stock materials. The addition of boron is designed to increase the stability above about 700° C., that is, the time during which the flux is active. The wetting of carbide metals and chromium-nickel steels themselves is not, however, improved in practice by the addition of boron, particularly when soldering with low working temperatures (below 680° C.).

Special soldering tasks, such as, for example, the joining of diamond-impregnated carbide metals require further reduced soldering temperatures so that the diamond filling and the carbide metal are not damaged. Cadmium-containing silver brazing solders or preferably gallium-containing silver brazing solders as described, for example, in DE 43 15 188 and DE 43 15 189, are used for said application. Said solders have a working temperature from 590° C. to 640° C. Conventional fluxes have only insufficient effectiveness and wetting ability in this temperature range. This reduces the process reliability during soldering and thus leads to increasing scrap and reduced product quality.

An object of the present invention is, therefore, to develop a flux for brazing difficult to wet stock materials such as stainless and scale-free steels and carbide metals, wherein all combinations of salts provided for by the standard DIN EN 1045 for brazing heavy metals (FH type)are used as the basic constituents of said flux, and which, with silver- and copper-based solders, permits a markedly improved wetting of the stock materials.

SUMMARY OF THE INVENTION

The above and other objects of the invention can be achieved by a flux based on inorganic boron and/or halogen compounds which contains, as an activating addition, based on the total amount of flux, 0.01–10 wt. % of elemental boron and 0.01–10 wt. % of at least one of the elements Mo, W, Mn, Ni, Pd, Cu or Ag in the form of elements, alloys or compounds.

Surprisingly, it has become apparent that as a result of the flux according to the invention, the wetting of difficult to wet materials such as stainless and scale-free steels and more particularly also carbide metals and hard materials with low metal contents is markedly improved compared with conventional fluxes. Evidently, the content of boron and additionally of at least one of the other elements brings about a corresponding activation of fluxes with an otherwise conventional composition. It is interesting in this connection that the individual constituents of said activator mixture on their own do not exhibit an improvement in the effectiveness of the conventional fluxes. Only the combination of boron with at least one of the elements, an alloy or compound of Mo, W, Mn, Co, Ni, Pd, Cu and Ag exhibits this surprising behavior in conjunction with brazing fluxes of boron and/or halogen compounds.

The brazing flux according to the invention is based substantially on conventional basic substances known for such fluxes and the compositions thereof in terms of quantity, as specified, for example, in terms of quality and quantity by the standard DIN EN 1045.

Basic constituents of such kind are inorganic boron and/or halogen compounds. Suitable boron compounds are primarily boric acid and borates or complex borates of alkali and alkaline earth metals, particularly borax (sodium tetraborate), potassium tetraborate and potassium tetrafluoroborate. Suitable halogen compounds are primarily fluorides and chlorides of alkali and alkaline earth metals, particularly potassium and sodium fluoride or potassium and sodium hydrogen fluoride.

DETAILED DESCRIPTION OF THE INVENTION

According to the invention, the brazing flux contains an activator combination of, based on the total amount, 0.01–10 wt. % of elemental boron and 0.01–10 wt. % of at least one of the elements Mo, W, Mn, Co, Ni, Pd, Cu or Ag in order to intensify the wetting. The flux preferably contains 0.1–5 wt. % of elemental boron and 0.1–5 wt. % of the other elements mentioned, in each case based on the total amount of flux.

Advantageously, the elemental boron used is boron in amorphous form. The other elements may be used on their own or in combination in elemental form, in the form of alloys containing them, or in the form of compounds thereof. Suitable compounds are preferably corresponding oxides.

The components of the activator combination are used advantageously in the finely powdered form, in which case the average particle size thereof should preferably be less than 45 $\mu$m.

The flux according to the invention for brazing difficult to wet materials is prepared by mixing, intensively and homogeneously, based on the total amount of flux, initially 0.01–10 wt. % of finely powdered boron powder with 0.01–10 wt. % of a finely powdered addition of at least one of the elements Mo, W. Mn, Co, Ni, Pd, Cu and Ag, which may be present in the form of elements, alloys or compounds, and then adding this activator mixture afterwards to the finely powdered flux mixture of inorganic boron and halogen compounds.

Flux mixtures which, in addition to boron, contain the elements tungsten or manganese in elemental form, as an alloy, or in the form of an oxide, are particularly effective.

The brazing flux according to the invention preferably contains, as activator mixture, based on the total amount of flux, 0.5–3 wt. % of boron in amorphous form and 0.5–3 wt. % of manganese with an average particle size in each case of less than 45 $\mu$m. The manganese may be used here in powder form as a metal, as an alloy or as an oxide compound without the effectiveness being affected as a result. Advantageously, the manganese is introduced in the form of the alloy MnNi40 or as manganese dioxide.

In order to adjust to certain stock materials and operating conditions, the flux may contain up to 2 wt. % of Si preferably in the form bound to oxygen, for example, as silicon dioxide. This additive, too, is added to the mixture in a correspondingly finely powdered form.

The flux according to the invention is initially present as a powder mixture and may already be used as such in an inherently known way.

The flux may also be present in the form of pastes or suspensions, for which the powder mixture is converted to a paste and/or suspension with inert liquids such as water, aliphatic alcohols, glycols etc.

Such flux pastes or suspensions may also contain minor amounts of auxiliary substances such as, e.g., conventional surfactants, binders or thickeners.

For application, the brazing flux according to the invention is applied to the stock material surfaces to be joined or soldered in a manner suitable for the form in question, for example, by sprinkling, coating, brushing, spraying or dipping, and the brazing process is carried out. In so doing, the flux according to the invention brings about a substantial improvement in the wetting behavior of the solder on the stock materials during brazing with silver- and copper-based solders. This is particularly pronounced and advantageous with difficult to wet metallic stock materials such as, in particular, stainless and scale-free steels and composite materials produced by powder metallurgy. The latter include carbide metals and hard materials of metal-ceramic composite materials (e.g. so-called "cermets"), more particularly those with a low metal content.

The flux according to the invention may also be combined with soldering materials, for example, as a powder mixture, as a paste or suspension, which contain, in addition, fine-particle brazing solder in each case.

Other solder-flux combinations are, for example, flux-coated solders which may be obtained, for example, by extrusion of drying or curing flux paste formulations on solder moulded parts such as rods and rings.

The examples given below provide typical embodiments and forms of application of the flux according to the invention:

Example 1

Flux Powder (FH 12 type According to DIN EN 1045 Which is Relied on and Incorporated Herein by Reference)

41 wt. % of potassium tetraborate 50 wt. % of potassium tetrafluoroborate 5 wt. % of potassium fluoride 2 wt. % of amorphous boron (average particle size<5 $\mu$m)

2 wt. % of manganese powder (average particle size<45 $\mu$m).

The stated constituents are weighed out and ground and homogenized in a Diosna agitator for 15 minutes. 0.5 g of this flux are applied to a 1 cm$^2$ carbide metal disc of SMG 02 (Cerametal, cobalt content 2–3 wt. %). A 3 mm long section of solder wire of the alloy L-Ag49 (Ag49Cu16Zn23Mn7.5Ni4.5) is applied and the disc is heated with the oxyacetylene burner to the melting point of the solder. The liquid solder wets the entire surface of the carbide metal within a short time.

For comparison, a flux of the same constituents without the activating addition of boron and manganese was prepared and tested as above. The solder melts, but wets the carbide metal only on the surface where applied. The solder does not flow over the entire surface.

Example 2

Aqueous Flux Paste

- 16.3 wt. % of potassium hydrogen fluoride
- 27.2 wt. % of potassium tetraborate
- 19.5 wt. % of potassium tetrafluoroborate
- 0.7 wt. % of manganese dioxide (average particle size<45 μm)
- 1.3 wt. % of amorphous boron (average particle size<5 μm)
- 1.0 wt. % of surfactant (Marlowet PW)
- 34.0 wt. % of water.

The corresponding amount of water is charged to a vessel with the surfactant. The remaining constituents are added successively, with stirring with a high-speed mixer, and homogenized for 30 minutes.

This paste is compared in terms of its effectiveness with a commercial flux paste for brazing carbide metals (FH12 type, Degussa h special). To this end, a thin coat of each paste is applied to a sheet of stainless steel (1.4301). Circular solder discs are punched out of a 500 μm thick solder strip of the alloy B-Ag60CuSn-600/700 and placed on the metal sheets. These are then heated to 750° C. on a silver block in a chamber oven and taken out of the oven after two minutes. After cooling, the surface area wetted with solder is measured and compared (wetting index) with the original surface area of the solder disc. The flux according to the invention provides a wetting index of 6–7 in this test, whereas the commercial flux yields a value of only 2–3.

Example 3

Flux Powder (FH 21 type According to DIN EN 1045)

- 35 wt. % of borax
- 40 wt. % of boric acid
- 22 wt. % of silica flour
- 1 wt. % of amorphous boron (average particle size<5 μm)
- 2 wt. % of manganese-nickel alloy 60/40 (average particle size<63 μm)

The flux is prepared in a similar way to Example 1. The improvement in effectiveness is demonstrated by a T-joint soldering of galvanized steel with the brass solder L-CuZn40. To this end, a 10 cm long, galvanized steel sheet is bent at an angle of 45° and placed on a second metal sheet. A 10 mm long solder wire of brass is placed together with the flux in one corner and heated with the oxyacetylene burner to the working temperature of the solder. The solder fills the slit completely in this test when the flux-according to the invention is used.

In comparison, when a flux of the same formulation but without the activating addition of boron and manganese-nickel alloy is used, the solder flows only as far as the middle of the bent metal sheet.

Further variations and modifications of the foregoing will be apparent to those skilled in the art and are intended to be encompassed by the claims appended hereto.

German priority application 199 21 332.1 is relied on and incorporated herein by reference.

We claim:

1. A flux comprising at least one of an inorganic boron or halogen compound for brazing difficult to wet metallic materials with silver- and copper-based solders, and as an activating addition, based on the total amount of flux, 0.01–10 wt. % of elemental boron and 0.01–10% of at least one of the elements selected from the group consisting of Mo, W, Mn, Co, Ni, Pd, and Ag in the form of an element, alloy or compound thereof.

2. The flux according to claim 1, which contains 0.1–5 wt. % of boron and 0.1–5 wt. % of at least one of the elements selected from the group consisting of Mo, W, Mn, Co, Ni, Pd, and Ag.

3. The flux according to claim 2 which contains 0.5–3 wt. % of amorphous boron and 0.5–3 wt. % of manganese as metal, as alloy or as oxide compound.

4. The flux according to claim 1 which contains 0.5–3 wt. % of amorphous boron and 0.5–3 wt. % of manganese as metal, as alloy or as oxide compound.

5. The flux according to claim 1 which contains the activating addition in finely powdered form with an average particle size of<45 μm.

6. The flux according to claim 1 in the form of a powder mixture, a paste or a suspension.

7. The flux according to claim 1 wherein the inorganic boron compound is an alkali borate or fluoroborate.

8. The flux according to claim 1 wherein the inorganic halogen compound is an alkali halide.

9. A solder-flux combination, comprising a solder and the flux according to claim 1.

10. The solder-flux combination according to claim 9, in the form of a powder mixture, a paste or a suspension and containing a fine-particle brazing solder.

11. The solder-flux combination according to claim 9, in the form of flux-coated solder moulded parts.

12. A carbide metal article having applied to a surface thereof the solder-flux combination according to claim 9.

13. A stainless steel article having applied to a surface thereof the solder-flux combination according to claim 9.

14. A galvanized steel article having applied to a surface thereof the solder-flux combination according to claim 9.

15. A method for increasing the wettability of silver- and copper-based solders for use in brazing difficult to wet metallic materials comprising adding to said solder an activator combination, based on the total amount of the flux of 0.1–10 wt. % of elemental boron and of 0.1–10 wt. % of at least one of the elements selected from the group consisting of Mo, W, Mn, Co, Ni, Pd, and Ag in the form of an element, alloy or compound thereof.

16. A method for increasing the wettability of silver- and copper-based solders for use in brazing difficult to wet metallic materials comprising adding to said solder an activator combination, based on the total amount of the flux of 0.1–10 wt. % of elemental boron and of 0.1–10 wt. % of at least one of the elements selected from the group consisting of Mo, W, Mn, Co, Ni, Pd, and Ag in the form of an element, alloy or compound thereof, based on the total amount of flux and thereafter mixing said activating addition with a finely divided flux.

17. A flux comprising:
    (a) inorganic boron and/or a halogen compound; and
    (b) an activating addition comprising:
        (i) 0.01–10 wt. % of elemental boron based on the total weight of the flux; and
        (ii) 0.01–10 wt. % of Mn based on the total weight of the flux.

18. A method for increasing the wettability of silver- and copper-based solder, the method comprising adding to the solder a flux comprising 0.1–10 wt. % of elemental boron based on the total weight of the flux and of 0.1–10 wt. % of Mn based on the total weight of the flux.

* * * * *